UNITED STATES PATENT OFFICE.

FRANZ O. MATTHIESSEN, OF NEW YORK, N. Y.

IMPROVEMENT IN REFINING SUGARS.

Specification forming part of Letters Patent No. 160,928, dated March 16, 1875; re'ssue No. 6,378, dated April 13, 1875; application filed April 8, 1875.

*To all whom it may concern:*

Be it known that I, FRANZ O. MATTHIESSEN, of New York, N. Y., have invented an Improved Process of Refining Sugar, of which the following is a specification:

In the ordinary process of refining sugar the raw sugar or concrete, as it is sometimes called, is clarified, and the resulting sugar-liquor is repeatedly boiled *in vacuo*, and after each boiling the crystallized sugar is mechanically separated from the sirup. The reheating of the sirup in the vacuum-pan exposes it to continued carbonization, and the respective products of the successive boilings are accordingly of increasingly dark colors and lower grades. After the last boiling and separation there still remains a portion of fluid which has to be barreled and marketed as sirup.

My improved process includes the boiling of the clarified-sugar liquor in the vacuum-pan until the usual crystallization has taken place, but instead of mechanically separating the crystals and reboiling the sirup I discharge the entire contents of the vacuum-pan directly into a vacuum-chamber, where the hot sirup containing the crystallized portion of the sugar is divided into small masses, or spread over a large surface, and subjected to a gentle heat, and consequent prolongation of the processes of evaporation and crystallization. This treatment is prolonged until the material operated upon has lost its fluid character and acquired the condition of a granular mass, substantially like what is known as "coffee-sugar," the slight portion of sirup present being adherent to the sugar-crystals. The heat of the sirup itself as it comes from the vacuum-pan is adequate to effect the required degree of evaporation in the vacuum-chamber if the material operated upon be divided into sufficiently-small masses—as, for example, if it be injected into a suitably high vacuum-chamber in the form of spray. A moderate application of heat will be required when the sirup, &c., is deposited in pans or trays in the vacuum-chamber; but the temperature must not be allowed to rise above 212° Fahrenheit, and it is preferable not to allow the temperature in the vacuum-chamber to rise above 120° Fahrenheit.

It will be seen that the distinctive characteristic of my invention is the subjection of the entire product of the boiling in the vacuum-pan to prolonged evaporation *in vacuo*, and hence there is a continuity of operation in respect to the avoidance of repeated boiling and re-exposure of the sugar to carbonization.

My improved process may be applied to the sirup, &c., produced by the first boiling of the sugar-liquor, or to the product of either of the subsequent boilings, the result in all cases being the production from the material operated upon by my process of one uniform grade of sugar, and the utilization of all the sugar present, so that there is no fluid remainder, and no loss by reason of having to market a portion of the sugar in the form of sirup.

I claim as my invention—

The improved process of refining sugar herein described, which consists, in addition to the ordinary boiling of the clarified-sugar liquor in the vacuum-pan, in dividing the hot sirup and crystallized sugar discharged from the vacuum-pan into small masses or thin layers, and subjecting such small masses or thin layers to a process of gentle evaporation *in vacuo*, prolonged until sufficient water has been expelled from the material operated upon to convert it into a granular mass, as set forth.

F. O. MATTHIESSEN.

Witnesses:
ISAAC ROMAINE,
F. M. QUIMBY.